United States Patent
Cho et al.

(10) Patent No.: US 11,829,546 B2
(45) Date of Patent: *Nov. 28, 2023

(54) BORDER TOUCH MODULE

(71) Applicant: TPK Touch Solutions (Xiamen) Inc., Fujian (CN)

(72) Inventors: Ching-Kai Cho, Changhua County (TW); Zhi Juan Lin, Zhangzhou (CN); Ting-Chieh Chien, Miaoli County (TW); Wei Jie Lin, Quanzhou (CN); Hua Li Luo, Fujian Province (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,801

(22) Filed: Jan. 13, 2023

(65) Prior Publication Data
US 2023/0205337 A1 Jun. 29, 2023

Related U.S. Application Data

(63) Continuation of application No. 17/565,050, filed on Dec. 29, 2021, now Pat. No. 11,586,314.

(51) Int. Cl.
*G06F 3/041* (2006.01)
(52) U.S. Cl.
CPC ........ *G06F 3/0412* (2013.01); *G06F 3/04164* (2019.05); *G06F 2203/04107* (2013.01); *G06F 2203/04113* (2013.01)

(58) Field of Classification Search
None
See application file for complete search history.

(56) References Cited

U.S. PATENT DOCUMENTS 11,586,314 B1 * 2/2023 Cho .................... G06F 3/04164

* cited by examiner

*Primary Examiner* — Brian M Butcher
(74) *Attorney, Agent, or Firm* — Cooper Legal Group, LLC

(57) ABSTRACT

The disclosure provides a border touch module, including a cover plate, a shielding layer, a first adhesive layer, a sensing electrode layer, a second adhesive layer, an opaque adhesive, and a backlight layer. The shielding layer is disposed below the cover plate. The first adhesive layer is disposed below the shielding layer. The sensing electrode layer is disposed below the first adhesive layer. The second adhesive layer is disposed below the sensing electrode layer. The opaque adhesive is disposed below the sensing electrode layer. The backlight layer is disposed below the opaque adhesive and is in the same plane as the second adhesive layer. The shielding layer has a backlight pattern, and the opaque adhesive has a light source hole. When the backlight layer is in the state of driving backlight, the light illuminates the backlight pattern of the shielding layer through the light source hole.

9 Claims, 3 Drawing Sheets

BORDER TOUCH MODULE

CROSS-REFERENCE TO RELATED APPLICATION

This application claims priority to and is a continuation of U.S. patent application Ser. No. 17/565,050, titled "BORDER TOUCH MODULE" and filed on Dec. 29, 2021, which is incorporated herein by reference.

FIELD OF DISCLOSURE

The present disclosure relates to a border touch module, and especially relates to a border touch module having a touch backlight pattern in a peripheral area of the display screen.

BACKGROUND

With the development of technology, touch devices are widely used as a user interface for portable electronic products such as smart phones, laptops, tablets, and any electronic products with a display screen.

With the development of display technology, reducing the border width of non-display areas is often an urgent technology need in the field. However, the narrowness of the border still has its limit, and the border cannot be completely abandon. Therefore, how to make good use of the peripheral area and make the peripheral area include an operation interface and other functions is an urgent problem to be solved at present.

SUMMARY

The purpose of the present disclosure is to provide a border touch module, including a cover plate, a shielding layer, a first adhesive layer, a sensing electrode layer, a second adhesive layer, an opaque adhesive, and a backlight layer. The shielding layer is disposed below the cover plate. The first adhesive layer is disposed below the shielding layer. The sensing electrode layer is disposed below the first adhesive layer. The second adhesive layer is disposed below the sensing electrode layer. The opaque adhesive is disposed below the sensing electrode layer. The backlight layer is disposed below the opaque adhesive and is located at a same plane as the second adhesive layer. The shielding layer has a backlight pattern, and the opaque adhesive has a light source hole. When the backlight layer is in a state of driving backlight, a light from the backlight layer illuminates the backlight pattern of the shielding layer through the light source hole.

In some embodiments of the present disclosure, the border touch module further includes a display layer disposed below the second adhesive layer and the opaque adhesive.

In some embodiments of the present disclosure, the backlight layer includes a flexible printed circuit board, a light guide layer, a light emitting diode, and an adhesive. The flexible printed circuit board is disposed on the display layer, and the flexible printed circuit board extends from the backlight layer away from the second adhesive layer. The light guide layer is disposed on the flexible printed circuit board in the backlight layer. The light emitting diode is disposed on the flexible printed circuit board and adjacent to the light guide layer. The adhesive covers a portion of an upper surface of the flexible printed circuit board and a portion of an upper surface and a sidewall of the light emitting diode, wherein the adhesive attaches to a portion of a lower surface of the shielding layer.

In some embodiments of the present disclosure, a thickness of the second adhesive layer is from 300 μm to 400 μm.

In some embodiments of the present disclosure, a thickness of the second adhesive layer is 350 μm.

In some embodiments of the present disclosure, the second adhesive layer includes a recess.

BRIEF DESCRIPTION OF THE DRAWINGS

The present disclosure can be more fully understood by reading the following detailed description of the embodiment, with reference made to the accompanying drawings as follows. It should be understood that, according to industry practice, the various features are not drawn to scale. In fact, for the sake of clarity, the size of the various features can be arbitrarily increased or decreased.

DETAILED DESCRIPTION

Figure 1:
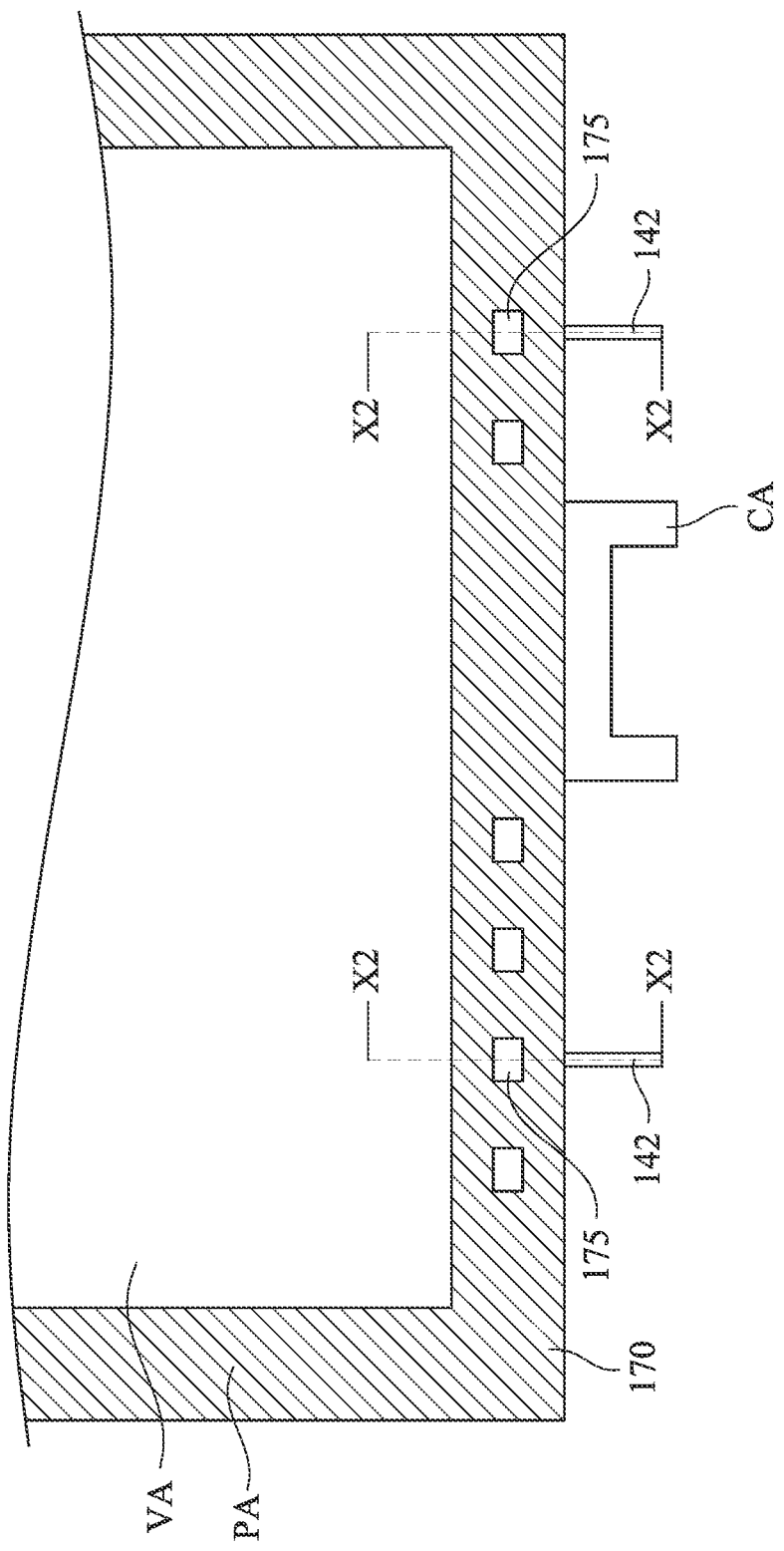
FIG. 1 is a top view of a border touch module relative to a border touch device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, the border touch module of the present disclosure can be used in any electronic product with display and touch function, such as a smart phone, laptop, tablet, screen with touch function, rearview mirror with touch function, etc. Additionally, the border touch module can effectively solve the problem of how to make good use of the area where the border is, so that the border also has the function of the operator interface when the border cannot be completely discarded.

Firstly, please refer to FIG. 1. FIG. 1 is a top view of the border touch module 100 relative to the border touch device 10 according to some embodiments of the present disclosure. As shown in FIG. 1, the border touch device 10 includes a visual area VA, a peripheral area PA, and a connection area CA. The peripheral area PA surrounds the visual area VA, while the connection area CA is connected to the peripheral area PA. It should be noted that, because FIG. 1 is a top view, the border touch module 100 of the present disclosure cannot be completely depicted. Thus the backlight pattern 175 can be referenced. In general, the backlight pattern 175 and its surroundings can be represented as a border touch module 100, or the border touch module 100 can have multiple backlight patterns 175.

In some embodiments of the present disclosure, FIG. 1 shows that the border touch module 100 is disposed in the lower border of the border touch device 10, but FIG. 1 is only an example and should not be used to limit the present disclosure. The border touch module 100 can be disposed in all peripheral area PA of the border touch device 10. In some embodiments of the present disclosure, FIG. 1 shows six backlight patterns 175 disposed in the border touch module 100. This is only an example and should not be used to limit the present disclosure. The number of the backlight patterns 175 disposed in the peripheral area PA can be selected according to the desired function, including, but not limited to, from 1 to 100.

Figure 2:
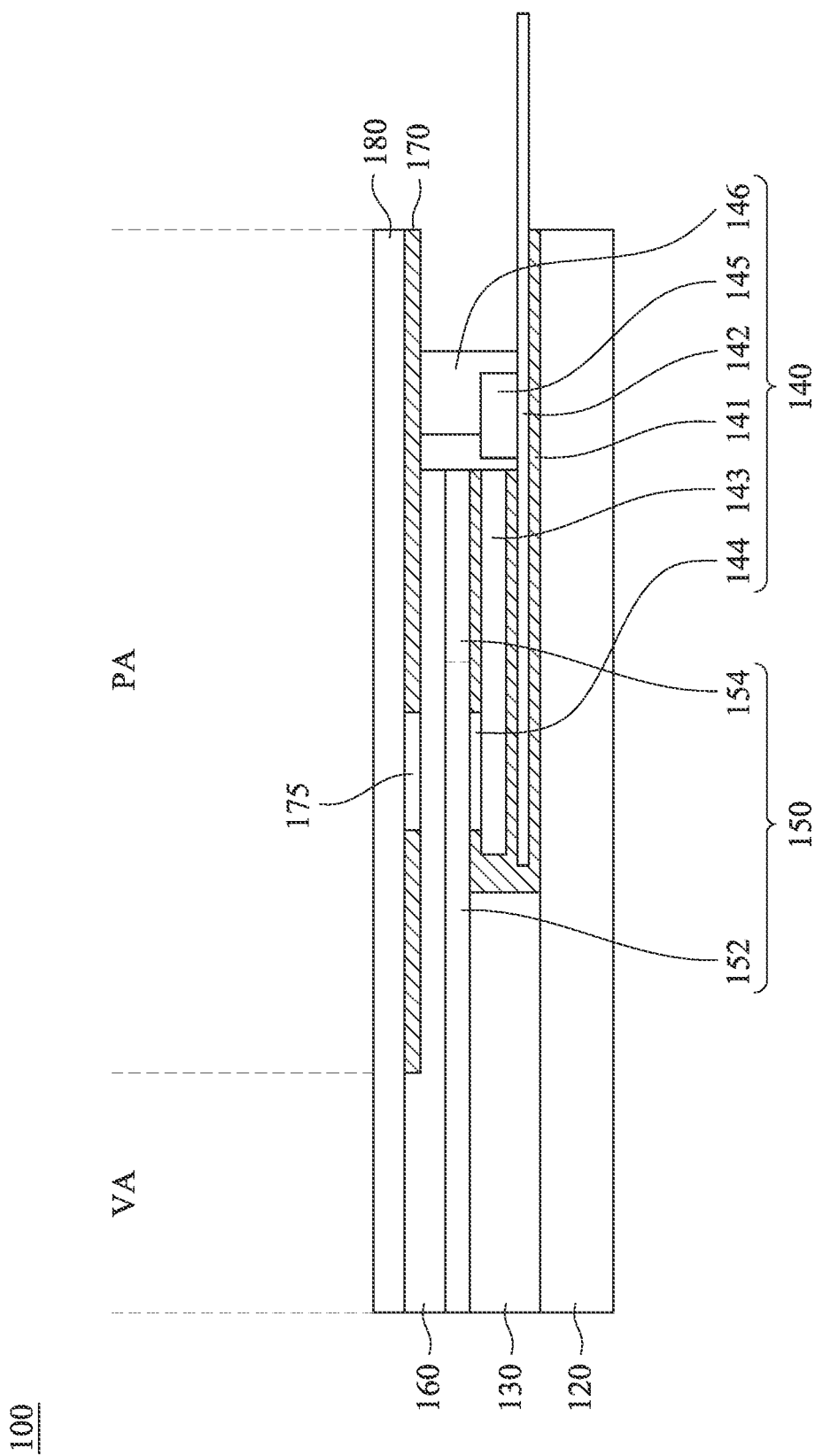
FIG. 2 is a cross-sectional schematic diagram along the section line X2-X2 of the border touch device in FIG. 1.

Next, please refer to FIG. 2. FIG. 2 is a cross-sectional schematic diagram along the section line X2-X2 of the border touch device in FIG. 1. As shown in FIG. 2, from the perspective of the section line X2-X2, the border touch module 100 includes a visual area VA and a peripheral area PA, and it can be seen from FIG. 1 that the peripheral area PA surrounds the visual area VA. In some embodiments, the border touch module 100 also includes a display layer 120, a second adhesive layer 130, a backlight layer 140, a sensing electrode layer 150, a first adhesive layer 160, a shielding layer 170, and a cover plate 180.

In some embodiments, the display layer 120 is disposed at the bottom of the visual area VA and the peripheral area PA. In one embodiment, the display layer 120 may include an organic light emitting diode (OLED).

As shown in FIG. 2, in some embodiments, the second adhesive layer 130 is disposed on the display layer 120 and extends from the visual area VA to the peripheral area PA. The second adhesive layer 130 can be added with a recess located in the peripheral area PA. It should be noted that the symbol of the recess is not marked in FIG. 2 in order to avoid confusion of symbols in FIG. 2. Specifically, the recess is the place where the backlight layer 140 is disposed. The characteristics of the backlight layer 140 will be detailed in the following paragraphs and will not be described here.

Figure 3:
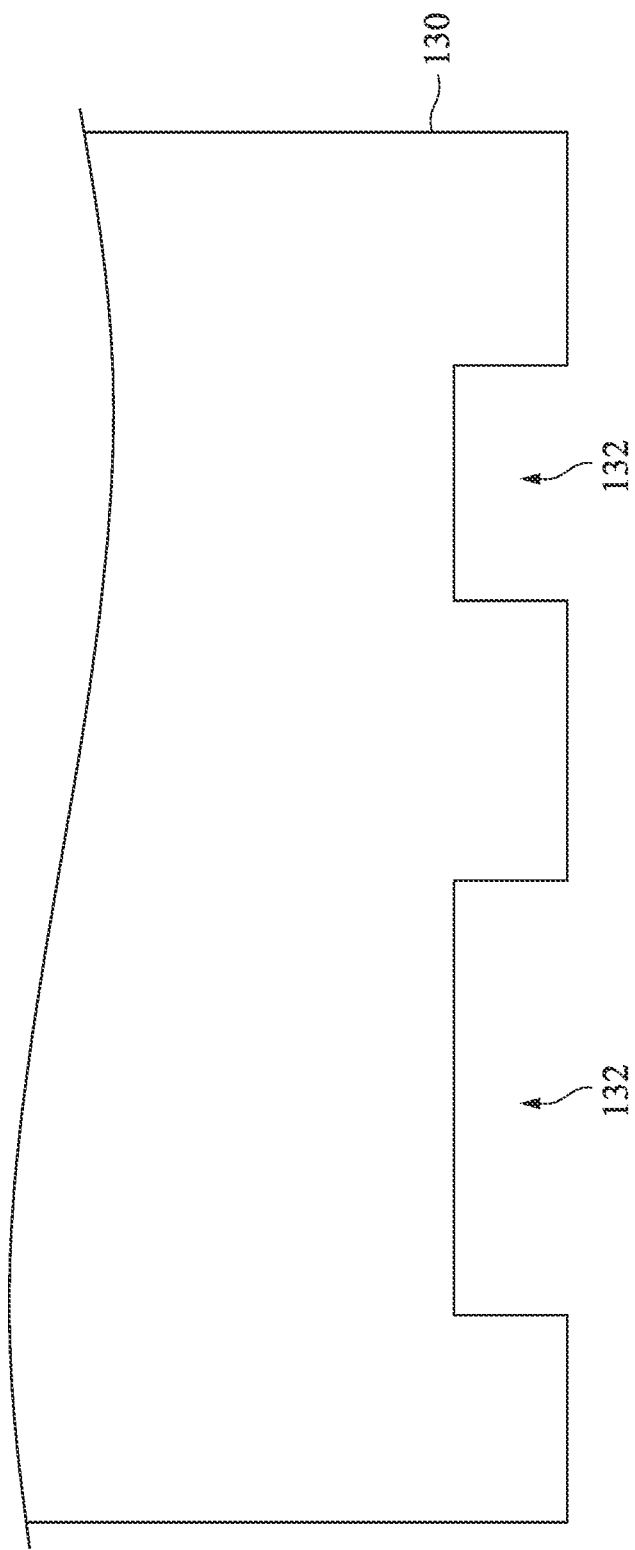
FIG. 3 is a top view of a second adhesive layer of the border touch module in FIG. 1 according to some embodiments of the present disclosure.

Here, please refer to FIG. 3. FIG. 3 is a top view of the second adhesive layer 130 of the border touch module 100 in FIG. 1 according to some embodiments of the present disclosure. Specifically, the second adhesive layer 130 as shown in FIG. 3 is one of the layers of border touch device 10 in FIG. 1. It can be clearly seen from FIG. 2 that when the second adhesive layer 130 extends to the peripheral area PA, the second adhesive layer 130 is a flat plane with four flat sides. However, it can be seen from the example in FIG. 3 that the second adhesive layer 130 has two recesses 132, both of which are located in the peripheral area PA and do not touch the visual area VA. In some embodiments, each of the recesses 132 is used to enable the placement of a backlight layer (not shown here) that matches the backlight pattern 175 shown in FIG. 1. It should be noted that FIG. 3 shows two recesses 132, which are only examples. The second adhesive layer 130 can be a flat plane with four flat sides, and more than one or only one recess 132 can be applied to the present disclosure.

In one embodiment, the second adhesive layer 130 may be any adhesive with transparent materials, including, but not limited to, optical adhesive or other similar adhesive layer. In one embodiment, the thickness of the second adhesive layer 130 is from about 300 μm to about 400 μm. In one embodiment, the thickness of the second adhesive layer 130 may be, but is not limited to, 300 μm, 310 μm, 320 μm, 330 μm, 340 μm, 350 μm, 360 μm, 370 μm, 380 μm, 390 μm, 400 μm, or any value between. Specifically, the thickness of the second adhesive layer 130 can match the thickness of the backlight layer 140, so that the backlight layer 140 can be disposed and adjacent to either side of the second adhesive layer 130, or the backlight layer 140 can be disposed closer to the visual area VA when the second adhesive layer 130 has a recess 132. It should be noted that the second adhesive layer 130 can have different thicknesses according to different thickness of the backlight layer 140.

In some embodiments, the backlight layer 140 is disposed on the display layer 120, adjacent to the first adhesive layer 160, and located in the peripheral area PA. Specifically, the backlight layer 140 is located at or near the periphery of the second adhesive layer 130. When the second adhesive layer 130 is designed with the recess 132, the backlight layer 140 can be closer to the visual area VA. It should be noted that in order to describe the characteristics of each component or layer in the backlight layer 140, all layers or structures of the border touch module 100 of the present disclosure will be described below.

In some embodiments, the sensing electrode layer 150 is disposed below the first adhesive layer 160 and in the visual area VA and the peripheral area PA. In one embodiment, the sensing electrode layer 150 includes an active region 152 and a trace region 154. The active region 152 extends from the visual area VA to a portion of the peripheral area PA. The trace region 154 is connected to the active region 152 and is located in the peripheral area PA. In some embodiments, the material of the active region 152 of the sensing electrode layer 150 includes, but is not limited to, transparent metal oxides such as indium tin oxide (ITO) or indium zinc oxide (IZO), or metal mesh, silver nanowire (SNW), graphene, carbon nanotubes, or other flexible conductive materials. In some embodiments, the trace region 154 of the sensing electrode layer 150 is electrically connected to various structures in the border touch module 100. The material of the trace region 154 may include, but is not limited to, carbon nanotubes, silver carbon nanotubes, copper carbon nanotubes, or a combination thereof.

In some embodiments, the first adhesive layer 160 is disposed above the sensing electrode layer 150 and located in the visual area VA and the peripheral area PA. In one embodiment, the first adhesive layer 160 may be any adhesive having a transparent material, including, but not limited to, optical adhesive or other similar adhesive layer.

Please refer to FIG. 2 again. In some embodiments, the shielding layer 170 is disposed below the cover plate 180 and above a portion of the first adhesive layer 160. A shielded area shielded by the shielding layer 170 forms the peripheral area PA, and similarly, an un-shield area not shielded by the shielding layer 170 forms the visual area VA. The shielding layer 170 has a backlight pattern 175, which can be text, symbol, or pattern. In one embodiment, the shielding layer 170 may be a dark shielding layer (e.g., a black shielding layer) or a light shielding layer (e.g., a white shielding layer). In some embodiments, the material of the shielding layer 170 may be either dark ink (e.g., black ink) or light ink (e.g., white ink). In one embodiment, ink components used for the shielding layer 170 include ethylbenzene, xylene, pigment, polyester resin, glycol ether solvent, additive, or a combination thereof.

In some embodiments, the backlight pattern 175 is disposed corresponding to the backlight layer 140 below the backlight pattern 175, and light required by the backlight pattern 175 is emitted from the backlight layer 140. In one embodiment, the backlight pattern 175 is hollowed out and filled with transparent or translucent film material. The shape of the hollowed out portion of the backlight pattern 175 is formed by drawing different words, symbols, or patterns according to the function represented. In some embodiments, the materials of backlight pattern 175 include, but are not limited to, ethylbenzene, xylene, pigments, polyester resins, glycol ether solvents, additives, or a combination thereof.

In some embodiments, the cover plate 180 is disposed above the portion of the first adhesive layer 160 and the shielding layer 170, and the visual area VA and the peripheral area PA are formed by the shielded or the un-shielded area of the shielding layer 170. In one embodiment, the material of the cover plate 180 can be hard transparent material or flexible transparent material, which can be selected from glass, polymethylmethacrylate (PMMA), polyvinyl chloride (PVC), polypropylene (PP), polyethylene terephthalate (PET), polyethylene naphthalate (PEN), polycarbonate (PC), polystyrene (PS), cyclo olefin polymers (COP), cyclo olefin copolymer (COC), and other transparent materials.

Please refer to FIG. 2 again. In order to make effective use of the peripheral area PA, the aforementioned second adhesive layer 130 is disposed, and the second adhesive layer 130 is designed to be similar to the portion of the local displacement (i.e. the recess 132 as shown in FIG. 3), so that the backlight layer 140 can be closer to the visual area VA. In one embodiment, the backlight layer 140 includes a flexible printed circuit board 142, a light guide layer 143, a light emitting diode 145, and an adhesive 146.

In one embodiment, the flexible printed circuit board 142 is disposed above the display layer 120 and extends from the backlight layer 140 and away from the first adhesive layer 160 to outside the peripheral area PA.

In one embodiment, the light guide layer 143 is disposed above the flexible printed circuit board 142 in the backlight layer 140. In some embodiments, the material of the light guide layer 143 includes a light-transmitting material, such as, but not limited to, silicone resin, epoxy resin, acrylic resin, or a combination thereof. The light guide layer 143 is used to transfer the light emitted by the light emitting diode 145 to the backlight pattern 175.

In one embodiment, the light emitting diode 145 is disposed on the flexible printed circuit board 142 and adjacent to the light guide layer 143. In some embodiments, the light emitting diode 145 can be a light emitting diode (LED) of any size. In some embodiments, the light emitting diode 145 may be, but is not limited to, a mini LED chip or a micro LED chip.

In one embodiment, the adhesive 146 covers a portion of the upper surface of the flexible printed circuit board 142 and a portion of the upper surface and side wall of the light emitting diode 145, and the adhesive 146 adheres to a portion of the lower surface of the shielding layer 170. The adhesive 146 is used to hold the light emitting diode 145 and maintain stability between the flexible printed circuit board 142, the light emitting diode 145, and the shielding layer 170. Furthermore, the adhesive 146 can make up for the reduced bonding strength of the second adhesive layer 130, which cannot be fully fitted due to the local displacement caused by the recess 132.

In some embodiments, the flexible printed circuit board 142 and the light guide layer 143 in the backlight layer 140 are bonded to each other by multiple opaque adhesives 141, as well as to the display layer 120, the second adhesive layer 130, and the sensing electrode layer 150. Specifically, the opaque adhesives 141 are disposed between the flexible printed circuit board 142 and the display layer 120, between the light guide layer 143 and the flexible printed circuit board 142, between the sensing electrode layer 150 and the light guide layer 143, and between the second adhesive layer 130, the light guide layer 143, and the flexible printed circuit board 142. Moreover, the opaque adhesive 141 disposed between the sensing electrode layer 150 and the light guide layer 143 has a light source hole 144, which is corresponding to the backlight pattern 175.

These opaque adhesives 141 are used to shield the light emitted by the light emitting diode 145 and prevent the light emitted by the light emitting diode 145 from leaking into the first adhesive layer 160 and other layers. In addition, in order to transmit the light emitted by the light emitting diode 145 to the backlight pattern 175 through the light guide layer 143, the light source hole 144 is disposed in the opaque adhesive 141 between the sensing electrode layer 150 and the light guide layer 143 to facilitate light release. Specifically, the position of the light source hole 144 should correspond to the position of the backlight pattern 175 above the light source hole 144. Otherwise, the light cannot be transmitted to the backlight pattern 175. Furthermore, the opaque adhesive 141 can compensate for the loss of bonding strength when the second adhesive layer 130 fails to fully fit due to the local displacement.

In some embodiments, materials of these opaque adhesives 141 include, but are not limited to, black foam, black double-sided adhesive, or a combination thereof.

To sum up, the present disclosure reveals that the second adhesive layer 130 is not fully attached between the sensing electrode layer 150 and the display layer 120. Or, the local displacement of the second adhesive layer 130 with the recess 132 is disposed to make good use of the peripheral area PA when disposing the backlight layer 140, so that the peripheral area PA is not only used as the border support, but has the operator interface functions.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A border touch module, comprising:
   a cover plate;
   a shielding layer with a backlight pattern, wherein the shielding layer is disposed below the cover plate;
   a first adhesive layer disposed below the shielding layer;
   a sensing electrode layer disposed below the first adhesive layer;
   a second adhesive layer disposed below the sensing electrode layer;
   a display layer disposed below the second adhesive layer; and
   a backlight layer disposed below the sensing electrode layer and located at a same plane as the second adhesive layer, wherein the backlight layer comprises:
      an opaque adhesive having a light source hole corresponding to the backlight pattern;
      a light guide layer disposed under the opaque adhesive; and
      a light emitting diode disposed adjacent to the light guide layer, wherein the light emitting diode and the light guide layer are disposed at a same plane.

2. The border touch module of claim 1, wherein:
   the backlight layer further comprises a flexible printed circuit board which extends from the backlight layer in a direction away from the second adhesive layer, and
   the light guide layer and the light emitting diode are disposed at a same plane of the flexible printed circuit board.

3. The border touch module of claim 1, wherein the opaque adhesive is arranged between the light guide layer and the sensing electrode layer.

4. The border touch module of claim 1, wherein:
   the backlight layer further comprises a flexible printed circuit board, and
   the opaque adhesive comprises:
      a first opaque adhesive portion bonding the flexible printed circuit board and the display layer;
      a second opaque adhesive portion bonding the flexible printed circuit board and the light guide layer;
      a third opaque adhesive portion having the light source hole, wherein the third opaque adhesive portion bonds the light guide layer and the sensing electrode layer; and
      a fourth opaque adhesive bonding the second adhesive layer, the light guide layer, and the flexible printed circuit board.

5. The border touch module of claim 1, wherein the backlight layer is located at a periphery of the second adhesive layer.

6. The border touch module of claim 1, wherein a thickness of the second adhesive layer is from 300 μm to 400 μm.

7. The border touch module of claim 1, wherein a thickness of the second adhesive layer is 350 μm.

8. The border touch module of claim 1, wherein the second adhesive layer comprises a recess.

9. The border touch module of claim 1, wherein:
   the backlight layer further comprises a flexible printed circuit board and an adhesive covering a portion of an upper surface of the flexible printed circuit board and a portion of an upper surface and a sidewall of the light emitting diode, and
   the adhesive attaches to a portion of a lower surface of the shielding layer.

* * * * *